US008692531B2

United States Patent
Kawashima (10) Patent No.: US 8,692,531 B2
(45) Date of Patent: Apr. 8, 2014

(54) SWITCHING REGULATOR PERFORMING OUTPUT VOLTAGE CHANGING FUNCTION

(75) Inventor: Tetsuya Kawashima, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 237 days.

(21) Appl. No.: 13/360,987

(22) Filed: Jan. 30, 2012

(65) Prior Publication Data

US 2012/0194157 A1 Aug. 2, 2012

(30) Foreign Application Priority Data

Jan. 31, 2011 (JP) .................................. 2011-018295

(51) Int. Cl.
*G05F 1/00* (2006.01)
(52) U.S. Cl.
USPC ............ 323/283; 713/300; 713/310; 713/320
(58) Field of Classification Search
USPC ......... 323/222, 271, 282, 283, 284, 285, 318, 323/322; 713/300, 310, 320
See application file for complete search history.

(56) References Cited

U.S. PATENT DOCUMENTS

2007/0085521 A1 4/2007 Nagai
2010/0033149 A1* 2/2010 De La Torre et al. ......... 323/283

FOREIGN PATENT DOCUMENTS

JP 2007-116804 A 5/2007

* cited by examiner

*Primary Examiner* — Nguyen Tran
*Assistant Examiner* — Afework Demisse
(74) *Attorney, Agent, or Firm* — Rossi, Kimms & McDowell LLP (57) ABSTRACT

A switching regulator can convert an input voltage to a desired output voltage by ON-OFF controlling switching elements with PWM signals. The switching regulator can include a communication interface circuit that receives external operation instructions, an output voltage setting section that changes an output voltage to an output voltage setting value upon receiving an output voltage changing instruction from the outside, a voltage divider and an ADC that converts an error voltage into a digital error signal e[n], the error voltage being a difference between a reference voltage Vref and a detected output voltage value Vfb. The switching regulator can also include a controller that includes an operation control section for calculating a duty factor signal d[n] to determine an ON time proportion of the switching elements and an output voltage changing control section for controlling operation to change the output voltage.

8 Claims, 12 Drawing Sheets

SWITCHING REGULATOR PERFORMING OUTPUT VOLTAGE CHANGING FUNCTION

BACKGROUND OF THE INVENTION

1. Field of the Invention

Embodiments of the invention relate to switching regulators for converting an input voltage to a desired output voltage by ON-OFF control of switching elements, and in particular, to switching regulators that dynamically change the output voltage.

2. Description of the Related Art

Figure 9:
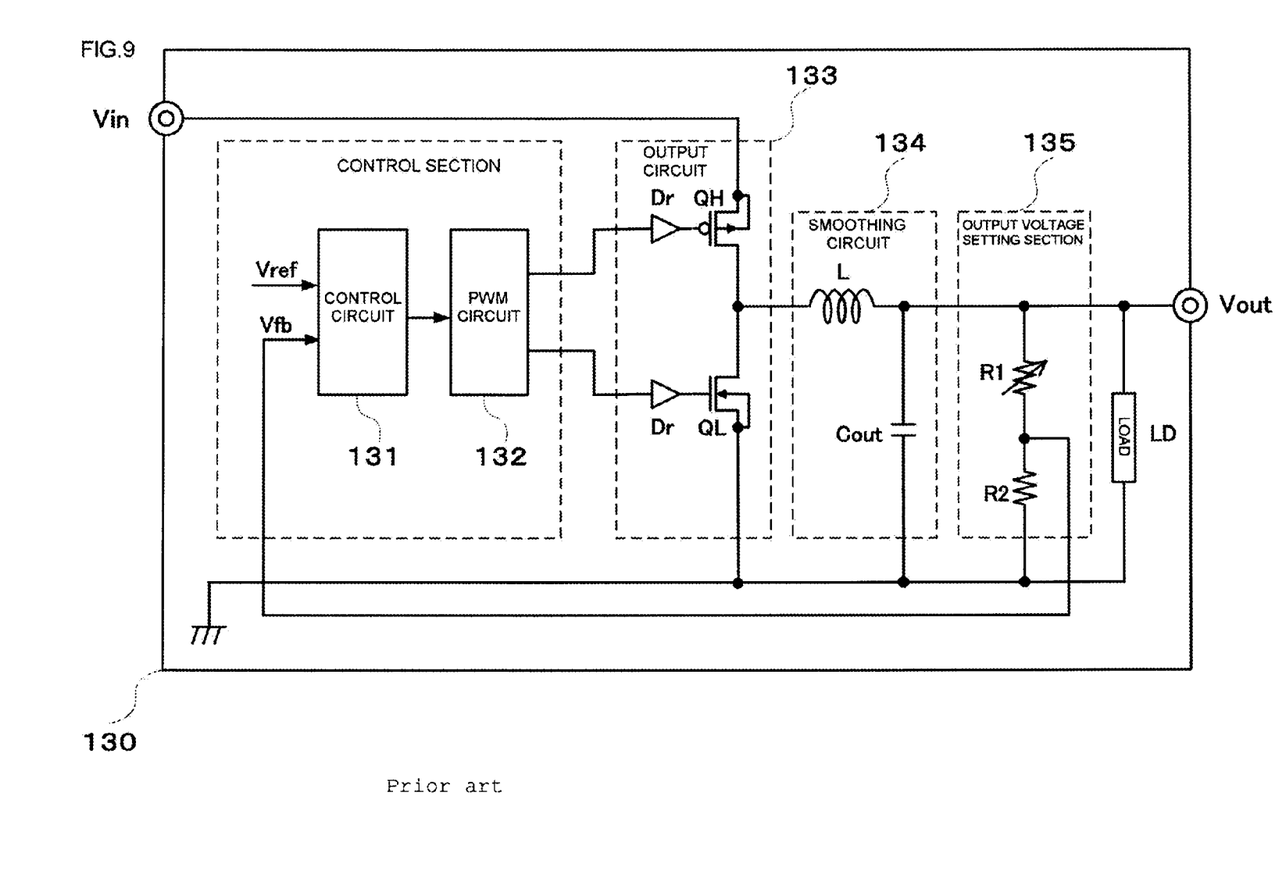
FIG. 9 shows an example of construction of a conventional switching regulator performing an output voltage changing function.

FIG. 9 shows an example of construction of a conventionally used common switching regulator. The switching regulator 130 shown in FIG. 9 converts an input voltage Vin to an output voltage Vout by ON-OFF controlling switching elements with pulse width modulation (referred to herein as "PWM") signals. The switching regulator 130 comprises: a control circuit 131 that controls an output corresponding to the error voltage between a reference voltage Vref and an output detection voltage Vfb that is a detected output voltage Vout; a PWM circuit 132 that outputs a pulse signal of a duty factor (a ratio of an ON period to the total period of ON and OFF periods) according to the output from the control circuit 131; an output circuit 133 that is composed of a pair of switching elements, a P-channel MOSFET (hereinafter referred to as PMOS) QH and an N-channel MOSFET (hereinafter referred to as NMOS) QL, and driving circuits Dr complementarily ON-OFF controlling the switching elements based on PWM signals; an LC smoothing circuit 134 that is composed of an inductor L and a capacitor Cout; and an output voltage setting section 135 that is a voltage divider circuit composed of a resistance R1 and a resistance R2. The output voltage Vout is supplied to a load LD.

The output detection voltage of the output voltage Vout is determined from a reference voltage Vref and the voltage divider ratio in the output voltage setting section 135. The switching regulator 130 shown in FIG. 9 has a variable resistance R1 in the output voltage setting section 135 so that the output voltage can be changed. In order to change setting of the output voltage, the resistance value of the variable resistance R1 must be changed every time the output voltage is to be changed.

Figure 10:
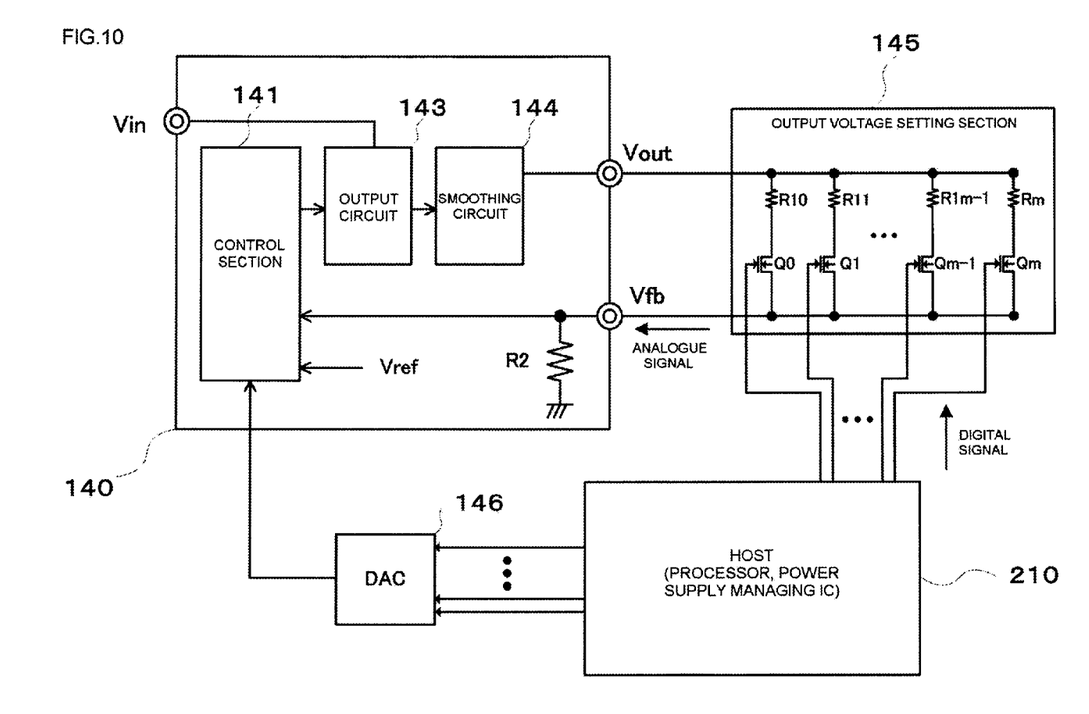
FIG. 10 shows an example of construction of a conventional switching regulator system with an output voltage setting change function that is controlled from the outside of the regulator.

FIG. 10 shows an example of construction of a switching regulator that allows the output voltage to be changed responding to the control signal from host devices such as a processor and a power supply managing IC. The switching regulator 140 shown in FIG. 10 installs a resistance R2 for changing the output voltage, the resistance R2 constructing a shunt circuit together with an externally provided output voltage setting section 145. The output voltage Vout is generated and outputted responding to instructions for output voltage setting values from a host 210.

The output voltage setting section 145 comprises parallel connection of the circuits each consisting of series connection of weighted resistance R1$i$ and a switching element Q$i$, $i$ being an integer from of 0 to m. The output voltage setting section 145 composes a type of digital-to-analogue conversion circuit (referred to herein as a "DAC") that receives the digital signals from the host 210 to control turning ON and OFF of the switching elements Q1 to Qm and outputs an analogue signal Vfb.

The construction shown in FIG. 10, however, is provided with the DAC 146 that converts instructions such as start and stop from the host 210 and delivers to the switching regulator 140 as well as the digital signal lines from the host 210 to the output voltage setting section 145, resulting in an increased packaging area.

A switching regulator of a digital power supply system is known to cope with the above problem. The switching regulator of the digital power supply system contains a digital communication interface that receives digital signals of instructions directly from the host and allows change of setting according to the instructions within the switching regulator. This type of switching regulator often employs a serial communication interface, which performs communication between the host and the switching, regulator with a small number of terminals and communication lines. The standards for the serial communication interface includes I2C (Inter-Integrated Circuit), SPI (Serial Peripheral Interface), and SM Bus (System Management Bus).

Figure 11:
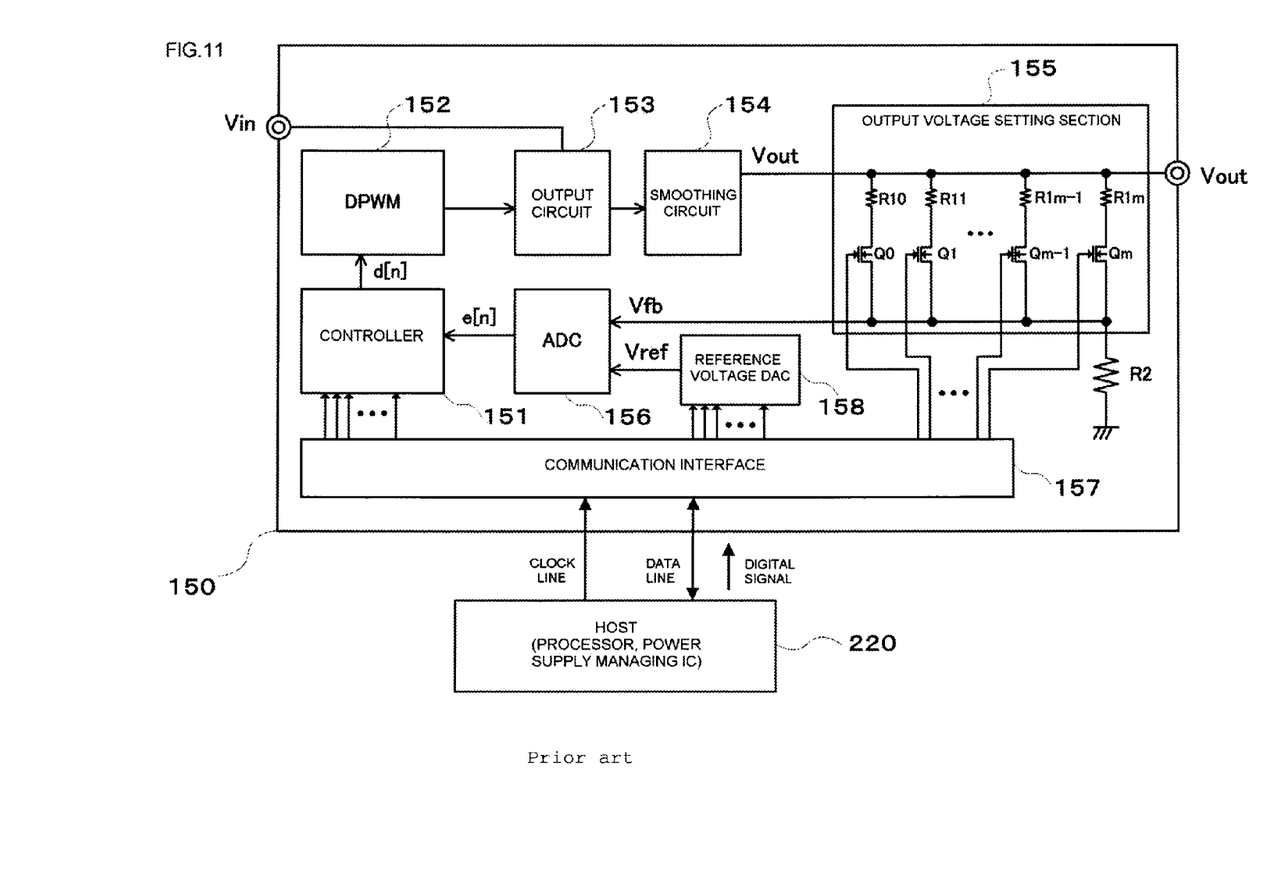
FIG. 11 shows an example of construction of a conventional switching regulator system that communicates with the outside of the regulator.

FIG. 11 shows an example of construction of the switching regulator of the digital power supply system. The switching regulator of the digital power supply system 150 of FIG. 11 comprises: a serial communication interface 157 that communicates instructions from a host 220; a DAC 158 controlled through the communication interface 157 and generates a reference voltage Vref; an analogue-to-digital conversion circuit (referred to herein as an "ADC") 156 that detects an error voltage between an output detection voltage Vfb of an output voltage Vout and the reference voltage Vref and converts the error voltage to a digital error signal e[n]; a controller 151 that performs control operation and outputs a duty factor signal d[n] for instructing a duty factor of a PWM signal from the received digital error signal e[n] under control through the communication interface 157; a digital PWM circuit (hereinafter referred to as a DPWM) 152 that converts the duty factor signal d[n] to a PWM signal with a corresponding duty factor; an output circuit 153 in which turning ON and OFF of switching elements are controlled by the PWM signal; a smoothing circuit 154 that makes a switching output signal smooth; an output voltage setting section 155 in which output voltage setting is controlled to a desired value under the control through the communication interface 157; and a voltage divider R2.

The ADC 156 performs analog-to-digital (hereinafter referred to as "AD") conversion in every switching period and "n" in the above description represents n-th switching period. There are various types of operational formulas for performing control operation of the duty factor signal d[n], among which a known formula is the digital PID control formula shown by Formula 1 below. In Formula 1, A, B, and C are compensation coefficients in PID (proportional, integral, and differential) control that are to be set to appropriate values corresponding to input and output conditions to stably control the output voltage Vout.

[Formula 1]

$$d[n]=d[n-1]+A\times e[n]+B\times e[n-1]+C\times e[n-2] \qquad (1)$$

The output voltage setting section 155 shown in FIG. 11 is a type of digital-to analogue conversion (DAC) circuit having the same structure as that of the output voltage setting section 145 shown in FIG. 10; the output voltage section 155 comprises parallel connection of the circuits each consisting of series connection of a weighted resistance R1$i$ and a switching element Q$i$, $i$ being an integer from 0 to m. The switching regulator 150, receiving an output voltage changing instruction from the host 220 through the communication interface 157, changes the reference voltage Vref and controls turning ON and OFF of the switching elements Q0 to Qm to change the divided voltage between the resistance R2 and each of the resistance R10 to R1m in the output voltage setting section 155, thereby controlling change of the output voltage value Vout. This construction having the serial communication interface 157 installed within the switching regulator 150 avoids increase in the number of digital signal lines and the packaging area.

Patent Document 1

Japanese Unexamined Patent Application Publication No. 2007-116804

Figure 12:
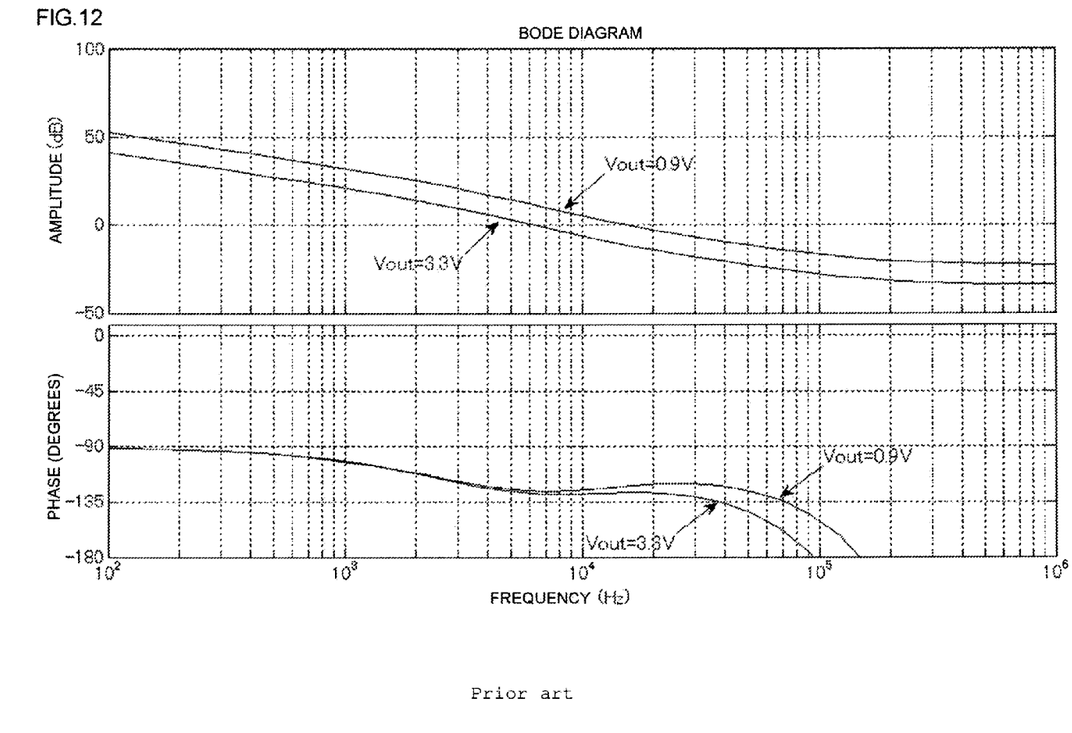
FIG. 12 shows loop characteristics of a switching regulator at different output voltages.

FIG. 12 compares examples of loop characteristics in terms of output voltage Vout of the switching regulator 150. Change in setting of the output voltage Vout changes the gain H, which is determined by the dividing proportion of the output voltage setting resistances, resulting in change in the loop gain. The dividing proportion here is the one between the resistance R2 and a resistance selected from the resistances R10 to R1m in the output voltage setting section 155.

[Formula 2]

$$H = \frac{R2}{R1 + R2} \quad (2)$$

Formula 2 above indicates that a low setting value of the output voltage Vout or a low value of the resistance R1 results in a large gain H, increasing the loop gain as shown in FIG. 12. As a result, a phase margin decreases and oscillation in the output voltage Vout may occur under some operating conditions.

More in detail, the change in the duty factor causes change in a delay time component td_pwm of the DPWM 152 as shown by Formula 3 below, resulting in change in the phase characteristics in high frequency zone. In Formula 3, D is the duty factor and Tsw is a switching period.

[Formula 3]

$$td\_pwm = D \times Tsw \quad (3)$$

An appropriate loop gain can be set by changing the compensation coefficients A, B, and C in the controller 151 as shown by Formula 1 corresponding to the output voltage Vout. A switching regulator of the digital power supply system can store favorable compensation coefficients in an internal register corresponding to each output voltage in the range of feasible setting and change the compensation coefficient values, as well as the output voltage setting resistance, by output voltage setting instruction from the host 220. Therefore, the loop characteristics can be readily changed to those suited to the output voltage setting value.

However, when the compensation coefficients are changed, in operation at a voltage value V1 of the output voltage Vout, to the coefficients suited to a voltage value V2, the change in the compensation coefficients causes discontinuity in calculation because the control operation according to Formula 1 executes arithmetic operation using the results in the previous switching periods d[n−1], B×e[n−1], and C×e[n−2]. Thus, an operational result off the control formula is given. Therefore, such malfunctions may result that the output voltage becomes disordered in the time of output voltage change or the time required for changing the output voltage is elongated.

In order to cope with the problem of response in output voltage change, Japanese Unexamined Patent Application Publication No. 2007-116804 (also referred to herein as "Patent Document 1") discloses that, in the time of output voltage change, feedback control is interrupted and instead, control is conducted based on the data prepared in a control table. The control based on the data in the control table corresponding to the amount of output voltage change is conducted at a high speed only in the time of changing an output voltage setting value, and in a steady state, output voltage control is returned to the feedback control. This method, according to the statement of Patent Document 1, can change the output voltage at a high speed without decreasing the conversion efficiency of the switching regulator. However, the method, which does not change compensation coefficients, leaves the problem of variation of loop gain due to the change of the output voltage value represented by the Formula 2 unsolved.

In order to solve this problem in a switching regulator capable of output voltage setting change, unstable operation must be prevented by setting compensation coefficients of a controller so that a sufficient phase margin is obtained in the entire possible output voltage setting range. This measure, however, does not perform appropriate control for every output voltage conditions, discarding optimum response characteristics. Consequently, when the current in the load connected to the switching regulator abruptly changes, for example, output voltage varies in a large range or it takes long time for the changed output voltage to recover the setting value, which causes malfunctions or damage of the load.

It is well known that both favorable response characteristics and stability can be achieved by increasing the switching frequency of the switching regulator. This measure, however, has a demerit to lower the conversion efficiency of the switching regulator, as mentioned in Patent Document 1.

SUMMARY OF THE INVENTION

In view of the above-described problems, embodiments of the invention provide a switching regulator exhibiting both favorable response characteristics and stability, which is achieved by the function of output voltage changing control that changes setting of compensation coefficients of a digital control operation formula to optimum values at the time of output voltage setting change.

In certain embodiments, a switching regulator is a switching regulator for converting an input voltage to a desired output voltage by controlling turning ON and OFF of switching elements with a pulse width modulation signal, the switching regulator comprising: a communication interface circuit that receives external operation instructions; an AD conversion circuit that converts an error voltage into a digital error signal, the error voltage being a difference between a reference voltage and a detected output voltage that is obtained by dividing the output voltage with a dividing proportion determined by an output voltage setting section; a controller that calculates a duty factor signal for determining an ON time proportion of the switching elements by digital operation based on the digital error signal; and a digital PWM circuit that generates the pulse width modulation signal corresponding to the duty factor signal; wherein the dividing proportion determined in the output voltage setting section is changed according to output voltage changing instruction from the communication interface circuit; and the controller comprises an output voltage changing control section that performs operations: to stop digital operation using the digital error signal upon receiving the output voltage changing instruction; to calculate a fixed duty factor, which is the duty factor giving a changing time output voltage for a steady state from a changing time input voltage; to assign the fixed duty factor to an initial value of the duty factor signal after the changing time; to determine compensation coefficients for use in digital operation appropriate for the output voltage setting value; and to control changing operation on the output voltage setting section.

In some embodiments, the controller can comprise an operational control section including: an error register for storing the digital error signal; a coefficient memory for storing the compensation coefficients; a coefficient register for storing compensation coefficients selected from the compensation coefficients stored in the coefficient memory; and an operational circuit for performing the digital operation using data in the error register and the coefficient register. The controller also can comprise an output voltage changing control section including: an internal signal generating circuit that generates signals for controlling operations of the operation control section and the output voltage setting section; and a fixed duty factor operating circuit that calculates the fixed duty factor.

A switching regulator of another aspect of the invention is a switching regulator for converting an input voltage to a desired output voltage by controlling turning ON and OFF of switching elements with a pulse width modulation signal comprising: a communication interface circuit that receives external operation instructions; a first AD conversion circuit that converts an error voltage into a digital error signal, the error voltage being a difference between a reference voltage and a detected output voltage that is obtained by dividing the output voltage with a dividing proportion determined by an output voltage setting section; a controller that calculates a duty factor signal for determining an ON time proportion of the switching elements by digital operation based on the digital error signal; a digital PWM circuit that generates the pulse width modulation signal corresponding to the duty factor signal; a second AD conversion circuit that converts an input voltage into a digital input voltage signal; and a third AD conversion circuit that detects an output current and converts the detected output current to a digital output current signal; wherein the dividing proportion determined in the output voltage setting section is changed according to output voltage changing instruction from the communication interface circuit; and the controller comprises an output voltage changing control section that performs operations: to stop digital operation using the digital error signal upon receiving the output voltage changing instruction; to calculate a fixed duty factor, which is the duty factor giving a changing time output voltage for a steady state from a changing time input voltage based on the digital input voltage signal, the digital output current signal, and a DC resistance component determined by constants of circuit components; to assign the fixed duty factor to an initial value of the duty factor signal after a changing time; to determine compensation coefficients for use in digital operation appropriate for the output voltage setting value; and to control changing operation on the output voltage setting section.

Embodiments of the invention involves output voltage change of a switching regulator. On a demand for dynamic change of an output voltage setting value, compensation coefficients are dynamically changed using a digital control circuit to avoid oscillation of the output voltage and deterioration of response characteristics due to the discrepancy between the output voltage setting values and the compensation coefficients. Hence, the switching regulator can be controlled with optimum compensation coefficients at any required output voltage change. In addition, the packaging area of the switching regulator can be kept relatively small.

DETAILED DESCRIPTION

A switching regulator performing an output voltage changing function according to embodiments of the present invention will be described in the following with reference to accompanying drawings.

First Embodiment

Figure 1:
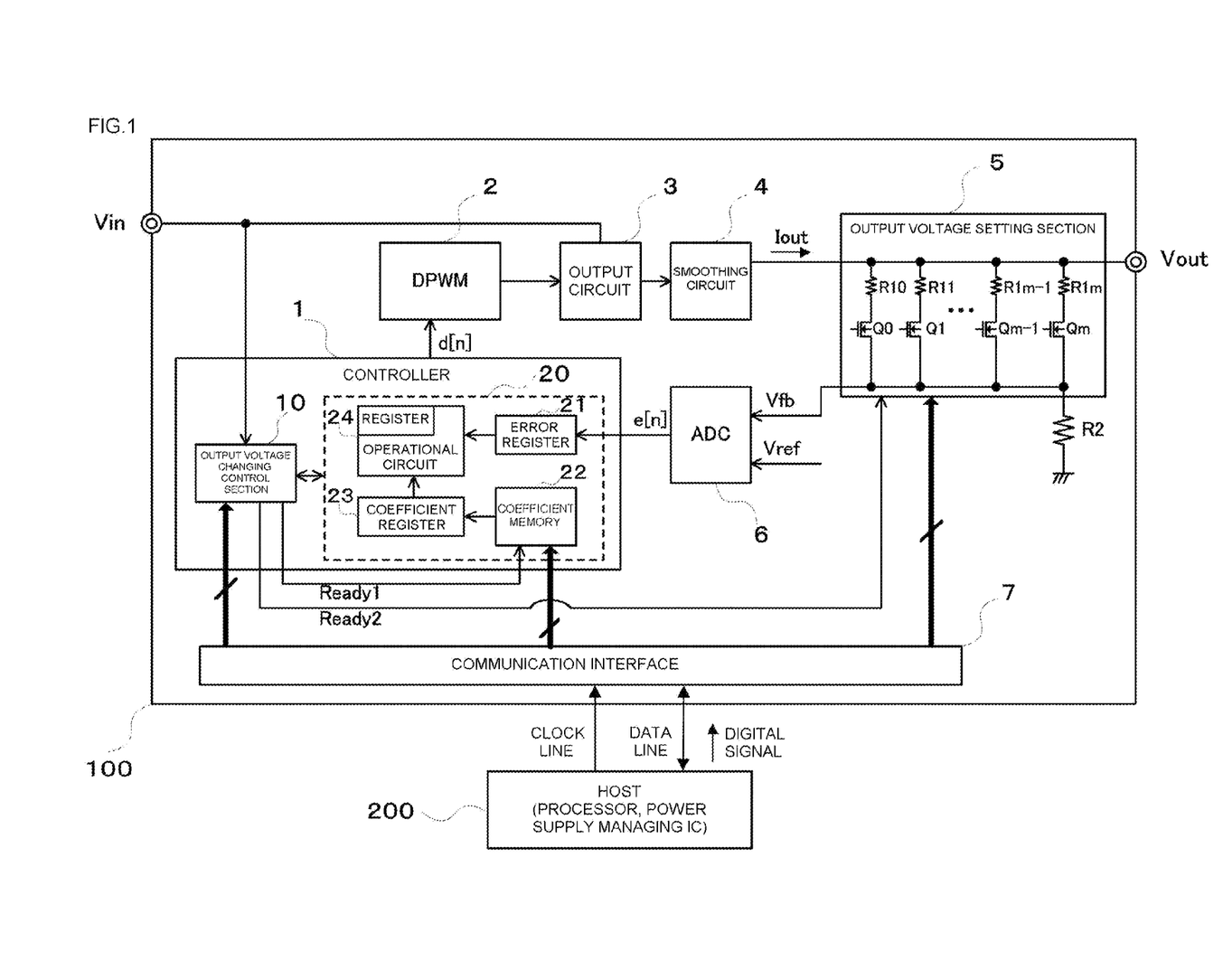
FIG. 1 shows a first embodiment of a switching regulator performing an output voltage changing function according to embodiments of the present invention.

FIG. 1 is a block diagram showing the construction of a switching regulator performing an output voltage changing function according to the invention. The same parts as the parts of the conventional switching regulator 150 shown in FIG. 11 are given the same symbols and the description thereon is omitted.

The switching regulator 100 shown in FIG. 1 is a switching regulator of a digital power supply system for converting an input voltage Vin into a desired output voltage Vout by controlling turning ON and OFF of switching elements with PWM signals. The switching regulator 100 comprises: a controller 1, a DPWM 2, an output circuit 3, a smoothing circuit 4, an output voltage setting section 5, an ADC 6, a communication interface 7, and a voltage divider R2. The ADC 6 converts an error voltage between an output detection voltage Vfb and a reference voltage Vref into a digital error signal e[n] at every switching period, wherein the output detection voltage Vfb is the output voltage Vout divided with a dividing proportion of the resistance in the output voltage setting section 5 and the voltage divider R2. The controller 1 has an output voltage changing control section 10 and an operational control section 20. The operational control section 20 comprises an error register 21 storing the digital error signal e[n], a coefficient memory 22 storing a plurality of compensation coefficients, a coefficient register 23 storing compensation coefficients selected from the plurality of compensation coefficients stored in the coefficient memory 22, and an operational circuit 24 executing digital operation using the data in the error register 21 and the coefficient register 23. The controller 1 executes the digital operation at every switching period using the digital error signal e[n] and the compensation coefficients in the coefficient register 23 so that the output voltage Vout becomes a target set voltage, thereby calculating and outputting a duty factor signal d[n] that determines the ON time proportion of the switching elements in the output circuit 3. The DPWM 2 generates PWM signals corresponding to the duty factor signal d[n] from the controller 1. The output circuit 3 controls turning ON and OFF of the switching elements according to the PWM signal and outputs a switching output signal. The smoothing circuit 4 makes the switching output signal smooth and outputs an output voltage Vout.

The switching regulator 100 shown in FIG. 1 is provided with a serial communication interface 7 for communication with an external host 200 through digital signal exchange, allowing change of setting value of the regulator. Setting change can be conducted for the output voltage Vout of the switching regulator 100 and for the compensation coefficients for use in the digital operation in the controller 1 according to the instructions from the host 200.

The output voltage setting section 5 is a type of digital-to-analogue converter (DAC) composed of parallel connection of the circuit each consisting of series connection of weighted resistance R1i and a switching element Qi, "i" being an integer from 0 to m. Turning ON and OFF of the switching elements Q0 to Qm is controlled by output voltage setting instructions given from the outside through the communication interface 7. The setting value of the output voltage Vout is determined by the dividing proportion of the resistance in the output voltage setting section 5 and the voltage divider R2.

The digital operation in the controller 1 is executed according to the digital PID control formula represented by Formula 1 using the compensation coefficients A, B, and C stored in the coefficient memory 22. Optimum values of the compensation coefficients differs depending on loop characteristics that are determined by an input voltage Vin, an output voltage Vout, and constants of the output circuit 3 and the smoothing circuit 4. The optimum compensation coefficients for each output voltage are stored in the coefficient memory 22. Corresponding to an output voltage instruction through the communication interface 7, optimum values of the compensation coefficients are selected from the coefficient memory 22 and registered in the coefficient register 23.

Upon receiving an output voltage changing instruction from the host 200 through the communication interface 7, the output voltage changing control section 10 of the controller 1 changes setting of the output voltage setting section 5 and the compensation coefficients.

Figure 2:
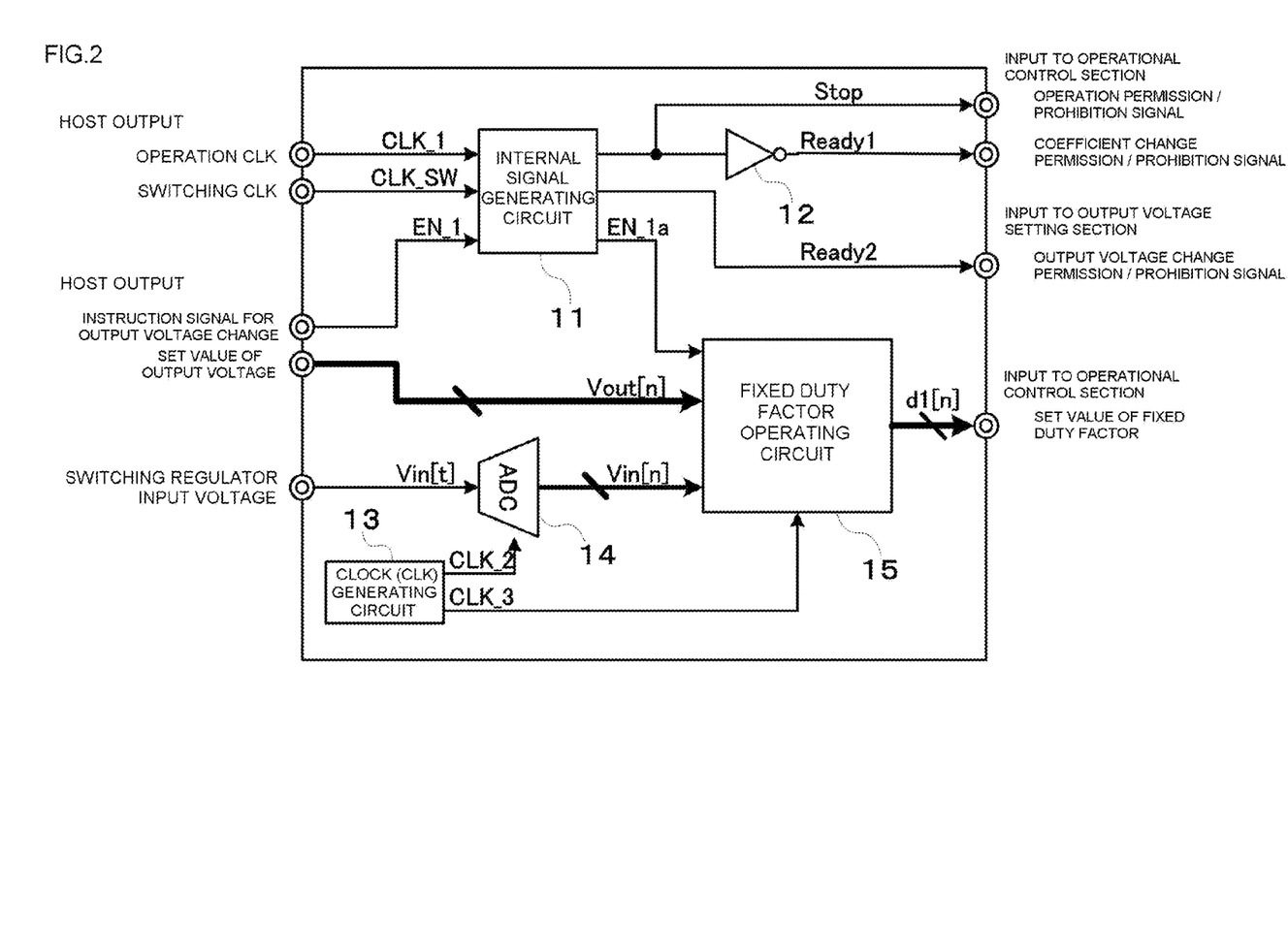
FIG. 2 shows a first example of construction of an output voltage changing control section in a first embodiment of the invention.

FIG. 2 shows an example of construction of the output voltage changing control section 10. The output voltage changing control section 10 of FIG. 2 comprises an internal signal generating circuit 11, an inverter 12, a CLK generating circuit 13, an ADC 14, and a fixed duty factor operating circuit 15. The internal signal generating circuit 11, receiving an output voltage changing instruction from the communication interface 7, generates an operation permitting/prohibiting signal Stop to control the digital operation in the controller 1 and an output voltage change prohibiting/permitting signal Ready2 to control the output voltage change operation of the output voltage setting section 5. A coefficient change prohibiting/permitting signal Ready1 is also generated by inverting the operation permitting/prohibiting signal Stop with an inverter 12 to control the operation for changing the compensation coefficients. The fixed duty factor operating circuit 15, receiving an output voltage setting instruction from the communication interface 7, performs operation of a fixed duty factor signal d1 corresponding to output voltage setting value and an input voltage value. The operation of the output voltage changing control section 10 is regulated by the clock signals CLK_2 and CLK_3 generated by the CLK generating circuit 13.

Figure 4:
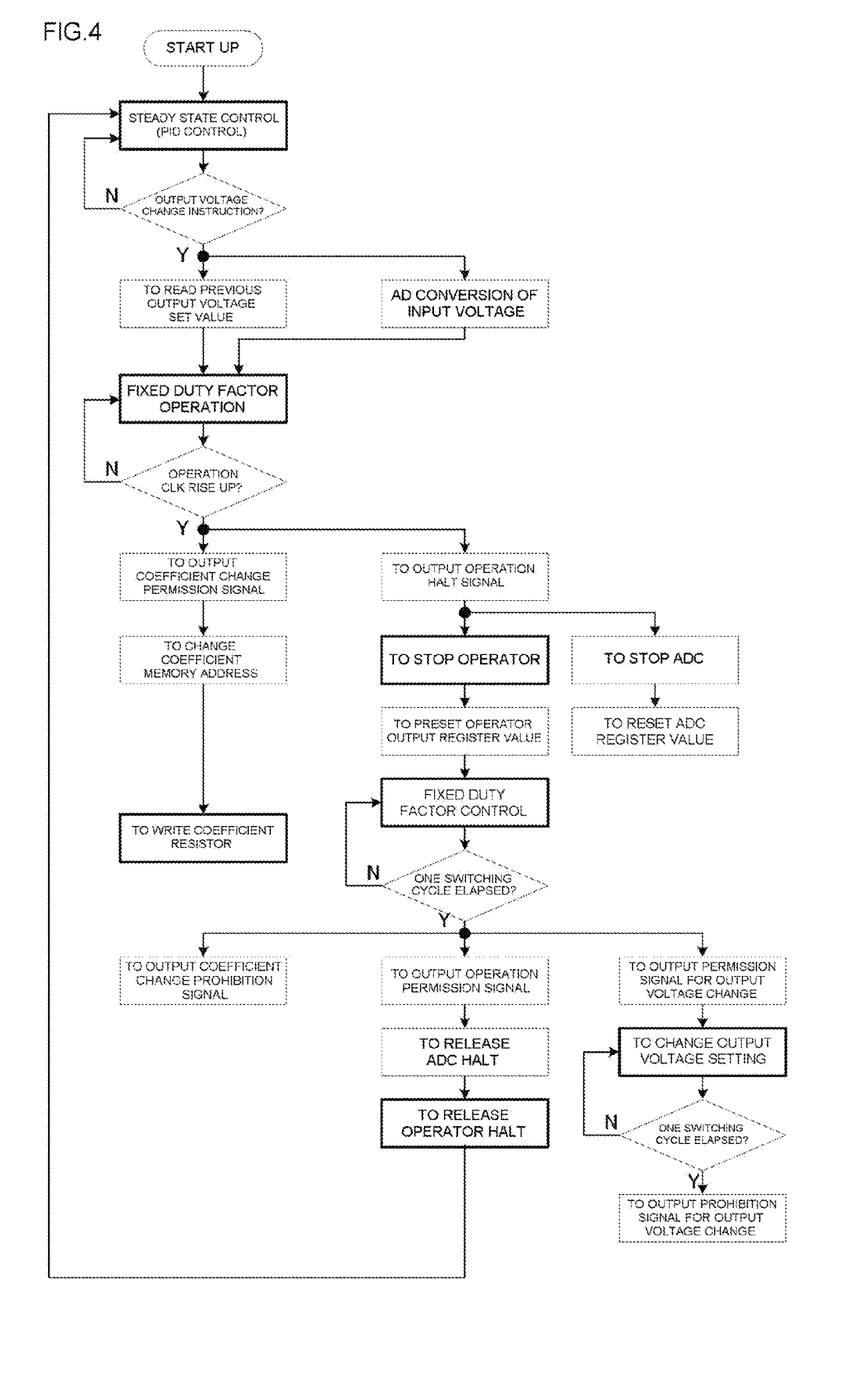
FIG. 4 shows an operational flow in an output voltage setting changing process in the first embodiment of the invention.

The following describes the operation of the switching regulator 100 upon receiving an output voltage changing instruction. FIG. 4 shows an operational flow upon receiving an output voltage changing instruction.

First, the output voltage changing control section 10, upon receiving an output voltage changing instruction, calculates the fixed duty factor signal d1 based on the output voltage setting instruction value at the present time and stores the signal d1 therein. The fixed duty factor signal d1 can be calculated by the Formula 4 below, where V1 is the output voltage setting value at the present time, Vin is the input voltage of the switching regulator 100, and N is the resolution of the DPWM 2.

[Formula 4]

$$d1 = \frac{V_1}{V_{in}} \times 2^N \quad (4)$$

When the input voltage Vin is unvarying, the Vin can be taken as a known value. When the input voltage Vin varies in the operation, a digital input voltage signal Vin[n] can be used for the input voltage Vin, the Vin[n] being the digital value converted from the input voltage Vin by the ADC 14 installed in the output voltage changing control section 10 as indicated in FIG. 2.

Figure 3:
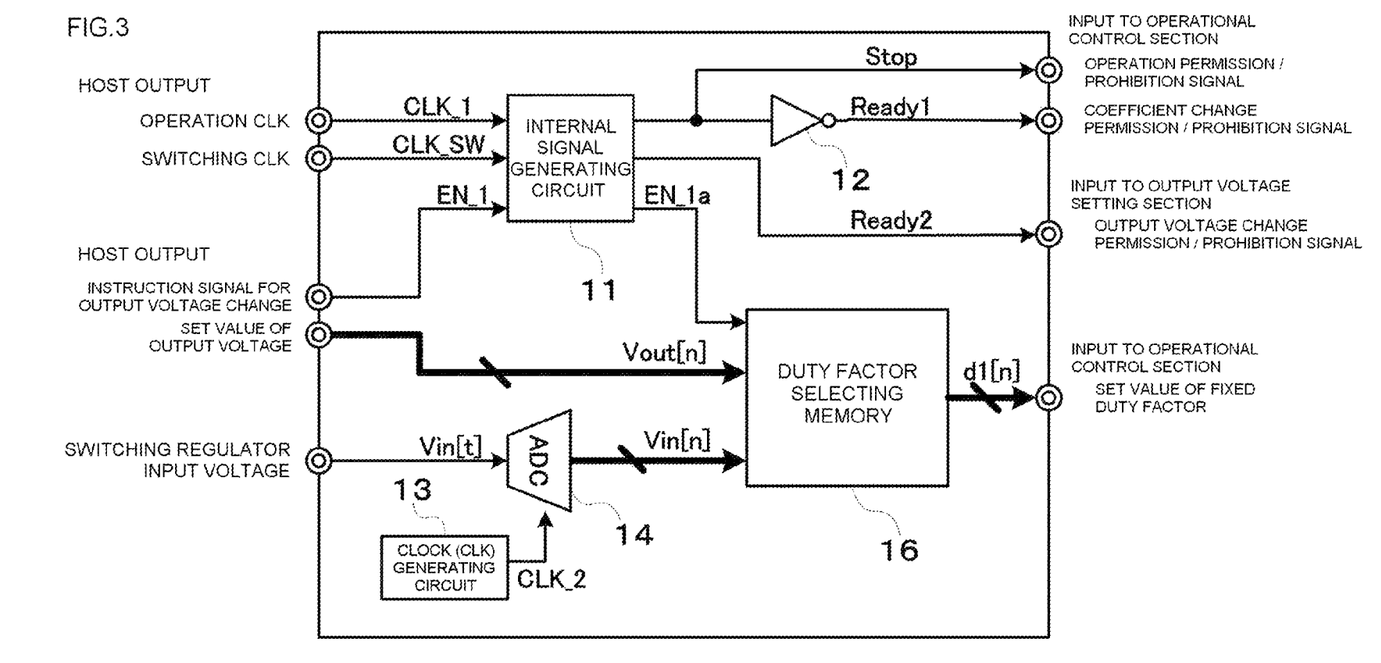
FIG. 3 shows a second example of construction of an output voltage changing control section in the first embodiment of the invention.

The fixed duty factor signal d1 can be obtained by another construction shown in FIG. 3. The construction of FIG. 3 has a duty factor selecting memory 16 in place of the fixed duty factor operating circuit 15 in FIG. 2. The duty factor selecting memory 16 stores a table of fixed duty factors corresponding to the values of input voltage Vin and output voltage Vout, and selects and outputs the appropriate value corresponding to the output voltage setting value Vout[n] and the digital input voltage Vin[n] of the input voltage Vin.

Then, the internal signal generation circuit 11 sets the operation permitting/prohibiting signal Stop to a high level to stop the digital operation in the controller 1 using the digital error signal e[n] and reset the error register 21 to zero. The output register value in the controller 1 is preset to the fixed duty factor signal d1 calculated in the output voltage changing control section 10. This process makes the output duty factor from the controller 1 to be d1 that determines the PWM signal for controlling the switching elements in the output circuit 3.

Since the digital operation is suspended in this period, the compensation coefficients A, B, and C to be used in the digital operation can be altered. The output voltage changing control section 10 sets the coefficient change prohibiting/permitting signal Ready1 to a low level and delivers to the operational control section 20, thereby changing the address in the coefficient memory 22 to the appropriate value corresponding to the output voltage setting value and changing, in turn, the value in the coefficient register 23.

Having changed the compensation coefficients, the output voltage changing control section 10 sets the output voltage change prohibiting/permitting signal Ready2 to a low level and delivers to the output voltage setting section 5, in which the voltage dividing proportion is changed by setting ON and OFF of the switching elements Q0 through Qm corresponding to an output voltage setting value to change an output voltage to the setting value.

The operation permitting/prohibiting signal Stop is set to a low level to release from the operation prohibiting state. Digital operation begins using the digital error signal e[n] and the compensation coefficients registered in the coefficient register 23. Since the new output voltage setting value is different from the output voltage at the moment, the ADC 6 detects the error voltage and the operational circuit 24 performs digital operation using the altered compensation coefficients.

Figure 5:
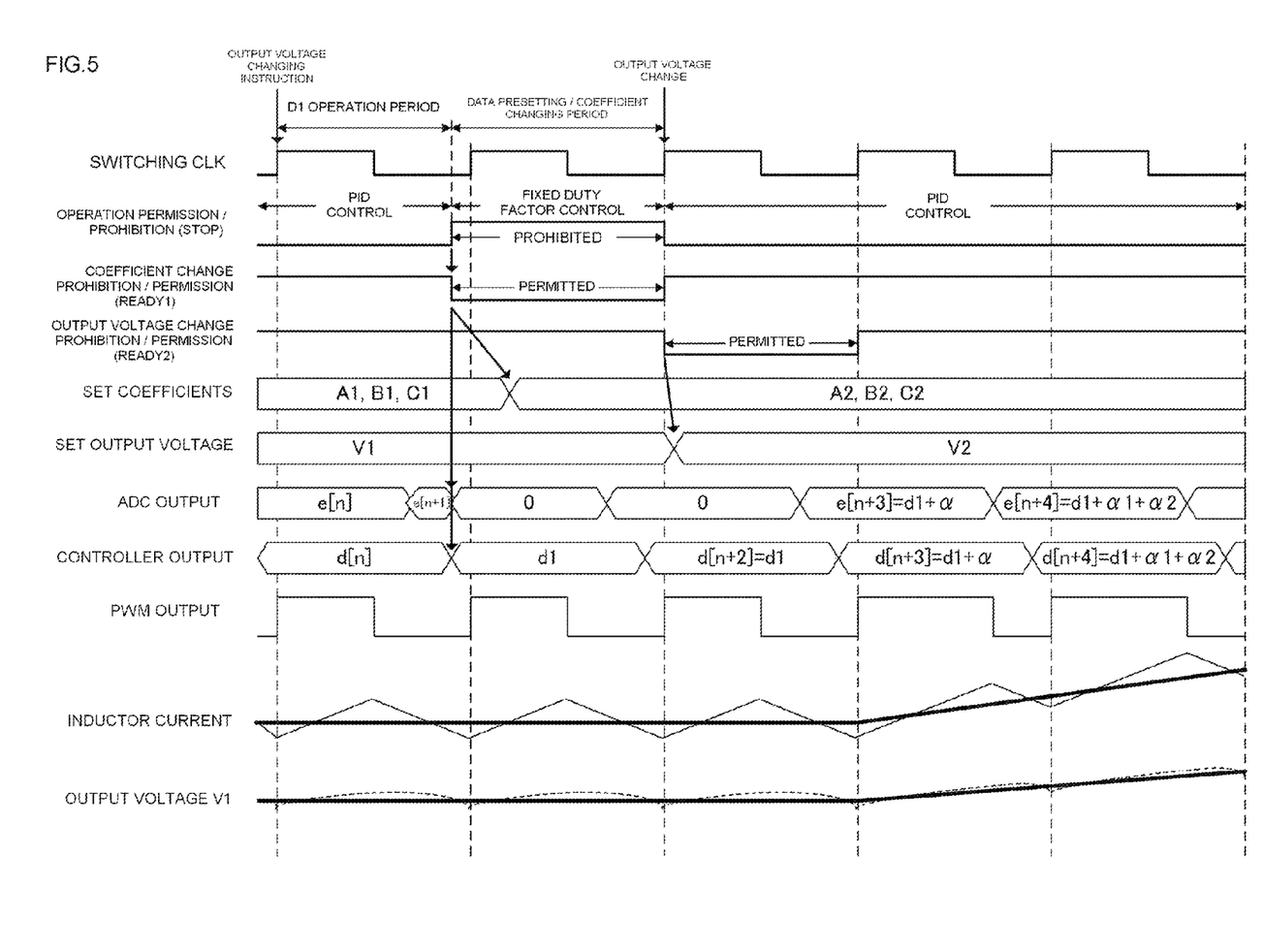
FIG. 5 shows an operational sequence in an output voltage setting changing process in the first embodiment of the present invention.

FIG. 5 shows an operation sequence on receiving an output voltage changing instruction as described above. FIG. 5 shows the operation sequence when the switching regulator 100 has received an output voltage changing instruction to change the output voltage to a setting value V2 from the host 200, in the state the switching regulator 100 is operating with the output voltage setting value V1 and the compensation coefficients A1, B1, and C1.

When the output voltage changing control section 10 receives an output voltage changing instruction and an output voltage setting value for changing the output voltage through the communication interface 7, the output voltage changing control section 10 calculates a fixed duty factor d1 according to Formula 4 based on the output voltage setting value V1 at the moment and an input voltage Vin.

The output voltage setting section 5 and the coefficient memory 22, despite receiving signals through the communication interlace 7, remain in the original state at this moment because the output voltage changing control section 10 has delivered a coefficient change prohibiting/permitting signal Ready1 and an output voltage change prohibiting/permitting signal Ready2 to prohibit data change.

The output voltage changing controller 10, after completion of calculating the fixed duty factor d1, delivers an operation permitting/prohibiting signal Stop to the operation control section 20 to stop PID control operation. The output value d[n] from the controller 1 is set to the fixed duty factor d1, which controls the PWM control. At this time, the values of the digital error signal e[n] delivered from the ADC 6 and previous digital error signals e[n−1] and e[n−2] stored in the error register 21 of the operational control section 20 are reset to zero. Further, the address of the coefficient memory 22 is changed from the value corresponding to A1, B1, and C1 that are appropriate for the present output voltage V1 to the value corresponding to A2, B2, and C2 that are appropriate for a newly instructed output voltage V2. The coefficient change prohibiting/permitting signal Ready1 from the output voltage changing control section 10 is released from the prohibiting state to set new compensation coefficients in the coefficient register 23.

After completion of the operations described above, the operation permitting/prohibiting signal Stop is released from the prohibiting state at the beginning of the next switching period to resume the PID control operation. At this moment, the duty factor signal d[n−1] in the previous switching period becomes the fixed duty factor d1 that is set in the controller 1. The digital error signals e[n], e[n−1], and e[n−2] in the previous switching period have been reset to zero. Therefore, a PID control operation output d[n] becomes d1 according to Formula 1 and the PWM control is performed with this fixed duty factor signal d1.

At the start of the next switching period, the output voltage change prohibiting/permitting signal Ready2 for the output voltage setting circuit 5 is released from the prohibiting state to change the output voltage setting value to V2. After that, controlled operation continues in the ordinary operation mode, in which PID control is conducted so as to decrease the error voltage between the reference voltage Vref and the output detection voltage Vfb, which is the output voltage setting voltage V2 divided with the voltage divider R2. The output voltage Vout is settled to V2 after several to several tens of switching periods. After setting to the V2, in which the compensation coefficients in the controller 1 are appropriate for the value V2, the controlled operation proceeds without instability due to insufficient phase margin, and good response characteristics are also achieved.

Second Example

In the switching regulator 100 as shown in FIG. 1, the fixed duty factor d1, which is a preset value for the time of output voltage changing operation, is obtained using the output voltage setting value V1 and the input voltage value Vin according to Formula 4. More accurate duty factor d1_a is given by Formula 5 below, where r is a DC resistance component (causing a DC loss) in the output circuit 3 and the smoothing circuit 4 and Iout is an output current.

[Formula 5]

$$d1\_a = \frac{V_1 + r \times I_{out}}{V_{in}} \times 2^N \quad (5)$$

Figure 6:
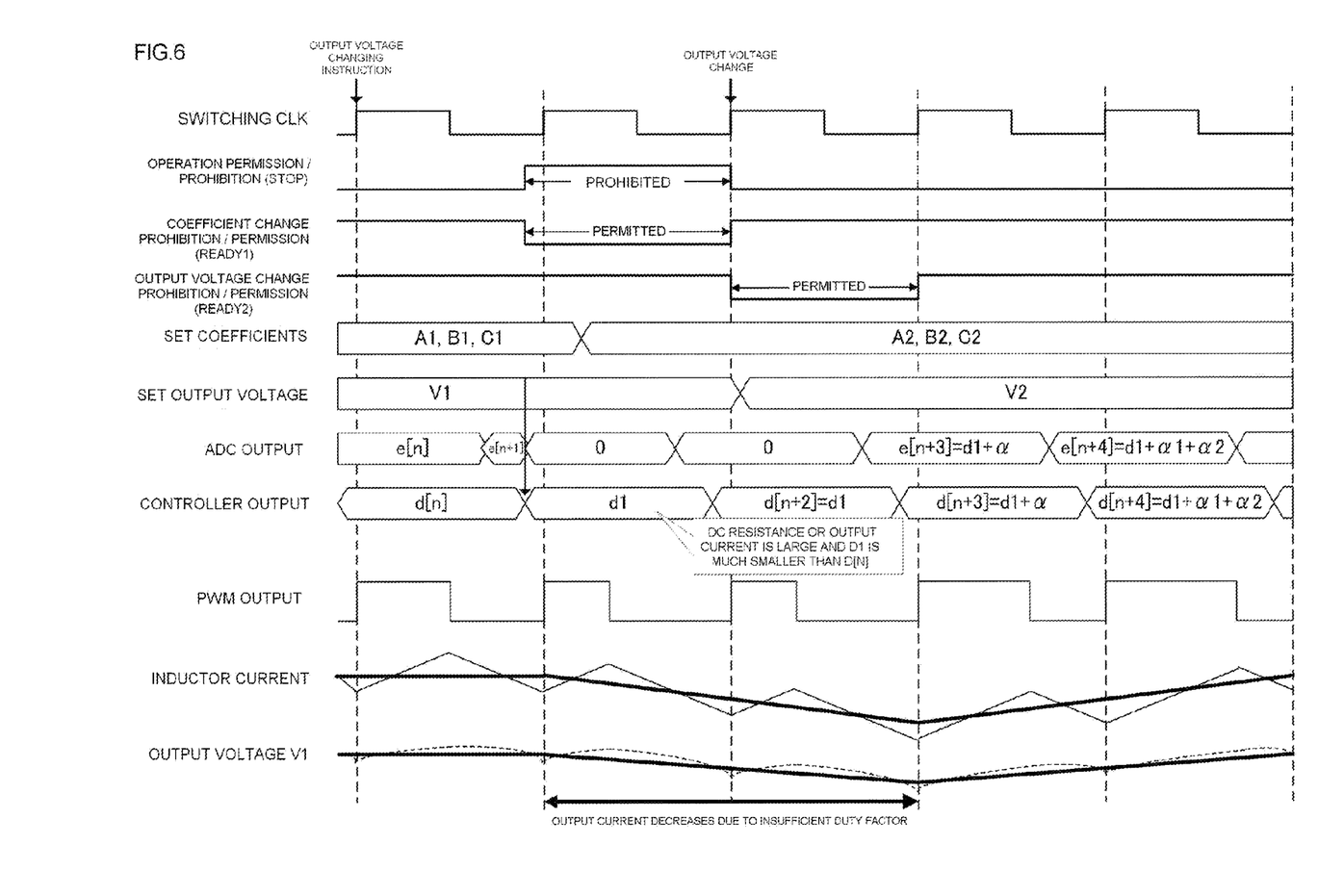
FIG. 6 shows an, operational sequence in an output voltage setting change process in the case of a large value of a DC resistance component or output current in the first embodiment of the present invention.

When output voltage changing operation is conducted in a switching regulator having a large DC resistance component r (resulting in large DC loss) or in a state at a high output current, the duty factor d1 given by Formula 4 is much smaller than the exact duty factor d1_a given by Formula 5. As a consequence, the duty factor is insufficient in the period of changing an output voltage setting value, resulting in lowering of the output voltage, as shown in FIG. 6, at least during two switching periods after compensation coefficient change.

Figure 7:
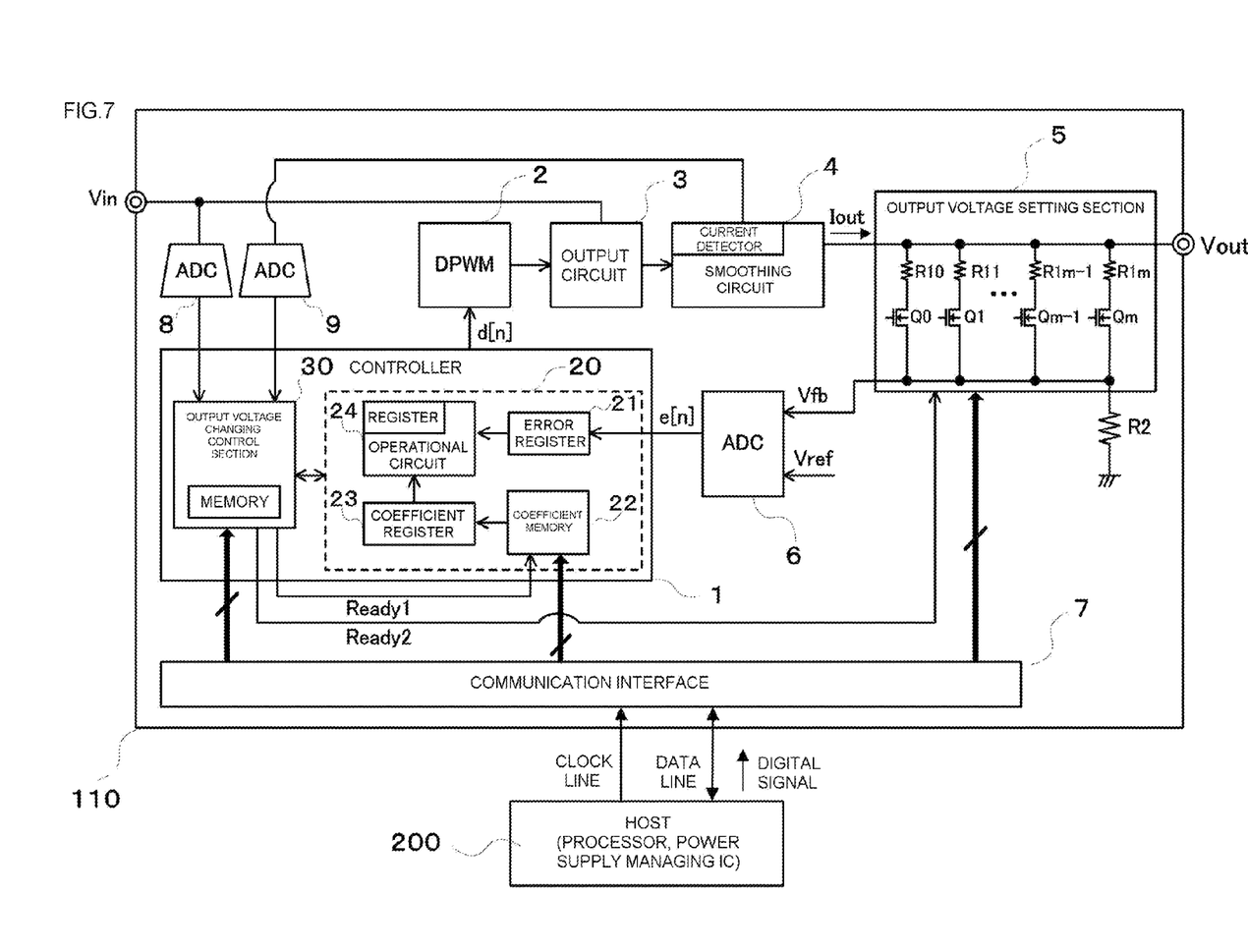
FIG. 7 shows a second embodiment of a switching regulator performing an output voltage changing function of the present invention.

FIG. 7 shows an example of construction of a switching regulator that avoids the problem of lowered output voltage in the time of output voltage changing operation. The switching regulator 110 of FIG. 7 is a switching regulator of a digital power supply system for converting an input voltage Vin into a desired output voltage Vout by controlling turning ON and OFF of switching elements With PWM signals. The switching regulator 110 comprises: a controller 1, a DPWM 2, an output circuit 3, a smoothing circuit 4, an output voltage setting section 5, an ADC 6, a communication interface 7, an ADC 8, an ADC 9, and a voltage divider R2. The switching regulator 110 of FIG. 7 has a similar construction to that of the regulator 100 of the First Embodiment shown in FIG. 1 and operates in a sequence similar to the one shown in FIG. 5. The switching regulator 110 of FIG. 7 is different from the switching regulator 100 of FIG. 1 in that the former is provided with an output current detecting means 4a in the smoothing circuit 4 and with the AD converters ADC 8 and ADC 9.

The means for detecting the output current Iout can be a device that detects the current flowing in the switching elements in the output circuit 3, or a device that detects the output current in the outside of the switching regulator 110.

The detected output current Iout is converted to a digital output current signal Iout[n] by the ADC 9. The DC resistance component r in Formula 5 is a known quantity determined from the constants of the components in the output circuit 3 and the smoothing circuit 4 and has been stored as a digital value in an internal memory in advance. The input voltage Vin is converted to a digital input voltage signal Vin[n] by the ADC 8. In the case of a system with a fixed input voltage Vin, the input voltage Vin is stored as a digital value in an internal memory in advance without using a converter like the ADC 8. An accurate duty factor can be obtained in the output voltage changing control section 30 that receives an output voltage setting value V1 before change through the communication interface 7 as well as the variables mentioned above and performs duty factor calculation according to Formula 5. The obtained accurate duty factor is used as a preset value for the fixed duty factor signal d[n] in the coefficient changing period, thereby avoiding the decrease of voltage in the coefficient changing period.

Figure 8:
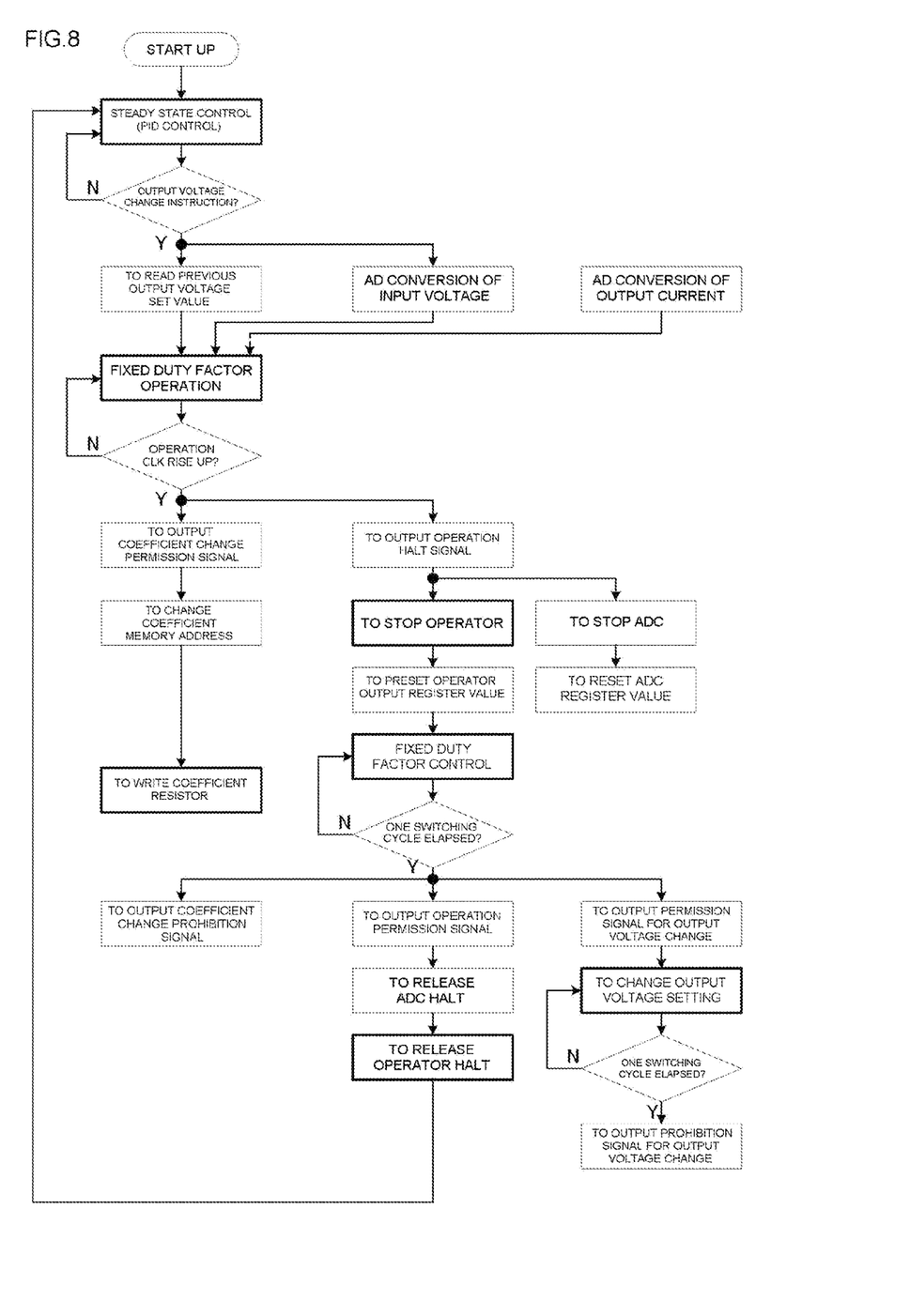
FIG. 8 shows an operational flow in an output voltage setting changing process in the second embodiment of the present invention.

FIG. 8 shows an operational flow on receiving the output voltage changing instruction in the switching regulator 110. The operational flow of FIG. 8 as described above is similar to the operational flow of FIG. 4 on receiving an output voltage changing instruction in the switching regulator 100 described previously excepting the AD conversion of the output current Iout and operational method of the fixed duty factor using the converted Iout. Thus, detailed description on the operational flow of FIG. 8 is omitted here.

The present invention involves output voltage change of a switching regulator. On a demand for dynamic change of an output voltage setting value, compensation coefficients are dynamically changed using a digital control circuit to avoid oscillation of the output voltage and deterioration of response characteristics due to the discrepancy between the output voltage setting values and the compensation coefficients. Hence, the switching regulator is always controlled with optimum compensation coefficients at any required output voltage change.

It should be acknowledged that the embodiments described thus far according to the invention may be modified by those skilled in the art without departing from the spirit and scope of the invention.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2011-018295, filed on Jan. 31, 2011, the contents of which are incorporated herein by reference in their entirety.

What is claimed is:

1. A switching regulator for converting an input voltage to a desired output voltage by controlling turning ON and OFF of switching elements with a pulse width modulation signal, the switching regulator comprising:
   a communication interface circuit that receives external operation instructions;
   an AD conversion circuit that converts an error voltage into a digital error signal, the error voltage being a difference between a reference voltage and a detected output voltage that is obtained by dividing the output voltage with a dividing proportion determined by an output voltage setting section;
   a controller that calculates a duty factor signal for determining an ON time proportion of the switching elements by digital operation based on the digital error signal; and
   a digital PWM circuit that generates the pulse width modulation signal corresponding to the duty factor signal;
wherein
   the dividing proportion determined in the output voltage setting section is changed according to output voltage changing instruction from the communication interface circuit; and
   the controller comprises an output voltage changing control section that performs operations:
      to stop digital operation using the digital error signal upon receiving the output voltage changing instruction;
      to calculate a fixed duty factor, which is the duty factor giving a changing time output voltage for a steady state from a changing time input voltage;
      to assign the fixed duty factor to an initial value of the duty factor signal after a changing time;
      to determine compensation coefficients for use in digital operation appropriate for the output voltage setting value; and
      to control changing operation on the output voltage setting section.

2. The switching regulator according to claim 1,
wherein the controller further comprises an operational control section including:
   an error register for storing the digital error signal;
   a coefficient memory for storing the compensation coefficients;
   a coefficient register for storing compensation coefficients selected from the compensation coefficients stored in the coefficient memory; and
   an operational circuit for performing the digital operation using data in the error register and the coefficient register;
and wherein the controller performs operations, upon receiving the output voltage changing instruction,
   to calculate the fixed duty factor in place of executing the digital operation and to deliver the calculated fixed duty factor to the digital PWM circuit;
   to reset data in the error register; and
   to select compensation coefficients appropriate to the output voltage setting value from the coefficient memory and registers the coefficients in the coefficient register.

3. The switching regulator according to claim 2,
wherein the output voltage changing control section comprises:
   an internal signal generating circuit that generates signals for controlling operations of the operation control section and the output voltage setting section; and
   a fixed duty factor operating circuit that calculates the fixed duty factor.

4. The switching regulator according to claim 3,
wherein the output voltage changing control section
further comprises an AD conversion circuit that converts the input voltage to a digital input voltage signal, and calculates the fixed duty factor from the digital input voltage signal and the output voltage setting value.

5. The switching regulator according to claim 3,
wherein the output voltage changing control section comprises a duty factor memory circuit, in place of the fixed duty factor operating circuit, for storing a plurality of duty factors corresponding to a plurality of sets of an input voltage and an output voltage, and selects the fixed duty factor to give the changing time output voltage from the changing time input voltage from the duty factor memory circuit.

6. A switching regulator for converting an input voltage to a desired output voltage by controlling turning ON and OFF of switching elements with a pulse width modulation signal, the switching regulator comprising:
 a communication interface circuit that receives external operation instructions;
 a first AD conversion circuit that converts an error voltage into a digital error signal, the error voltage being a difference between a reference voltage and a detected output voltage that is obtained by dividing the output voltage with a dividing proportion determined by an output voltage setting section;
 a controller that calculates a duty factor signal for determining an ON time proportion of the switching elements by digital operation based on the digital error signal;
 a digital PWM circuit that generates the pulse width modulation signal corresponding to the duty factor signal;
 a second AD conversion circuit that converts an input voltage into a digital input voltage signal; and
 a third AD conversion circuit that detects an output current and converts the detected output current to a digital output current signal;
wherein
 the dividing proportion determined in the output voltage setting section is changed according to output voltage changing instruction from the communication interface circuit; and
 the controller comprises an output voltage changing control section that performs operations:
  to stop digital operation using the digital error signal upon receiving the output voltage changing instruction;
  to calculate a fixed duty factor, which is the duty factor giving a changing time output voltage for a steady state from a changing time input voltage based on the digital input voltage signal, the digital output current signal, and a DC resistance component determined by constants of circuit components;
  to assign the fixed duty factor to an initial value of the duty factor signal after a changing time;
  to determine compensation coefficients for use in digital operation appropriate for the output voltage setting value; and
  to control changing operation on the output voltage setting section.

7. The switching regulator according to claim 6,
wherein the controller further comprises an operational control section including:
 an error register for storing the digital error signal;
 a coefficient memory for storing the compensation coefficients;
 a coefficient register for storing compensation coefficients selected from the compensation coefficients stored in the coefficient memory; and
 an operational circuit for performing the digital operation using data in the error register and the coefficient register;
and wherein the controller performs operations, upon receiving the output voltage changing instruction,
 to calculate the fixed duty factor in place of executing the digital operation and to deliver the calculated fixed duty factor to the digital PWM circuit;
 to reset data in the error register; and
 to select compensation coefficients appropriate to the output voltage setting value from the coefficient memory and registers the coefficients in the coefficient register.

8. The switching regulator according to claim 7,
wherein the output voltage changing control section comprises:
 an internal signal generating circuit that generates signals for controlling operations of the operation control section and the output voltage setting section;
 a memory circuit that stores the DC resistance component in advance;
and
 a fixed duty factor operating circuit that calculates the fixed duty factor.

* * * * *